United States Patent
Deffler

(10) Patent No.: US 7,831,614 B2
(45) Date of Patent: Nov. 9, 2010

(54) SYSTEM AND METHOD FOR GENERATING SQL USING TEMPLATES

(75) Inventor: Tad A. Deffler, Boonton, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 1016 days.

(21) Appl. No.: 10/888,146

(22) Filed: Jul. 9, 2004

(65) Prior Publication Data

US 2005/0120014 A1    Jun. 2, 2005

Related U.S. Application Data

(60) Provisional application No. 60/486,773, filed on Jul. 11, 2003.

(51) Int. Cl.
G06F 7/00 (2006.01)
G06F 17/30 (2006.01)

(52) U.S. Cl. .................................. 707/779; 707/808
(58) Field of Classification Search .................. None
See application file for complete search history.

(56) References Cited

U.S. PATENT DOCUMENTS

| | | | | |
|---|---|---|---|---|
| 5,295,256 A | | 3/1994 | Bapat | 717/137 |
| 5,640,550 A | | 6/1997 | Coker | |
| 5,649,139 A | * | 7/1997 | Weinreb et al. | 711/202 |
| 5,664,173 A | | 9/1997 | Fast | |
| 5,909,678 A | * | 6/1999 | Bergman et al. | 707/4 |
| 6,105,043 A | | 8/2000 | Francisco et al. | |
| 6,115,703 A | * | 9/2000 | Bireley et al. | 707/2 |
| 6,748,374 B1 | | 6/2004 | Madan et al. | |
| 2002/0095397 A1 | * | 7/2002 | Koskas | 707/1 |
| 2003/0074651 A1 | * | 4/2003 | Allison | 717/143 |
| 2003/0225888 A1 | * | 12/2003 | Wason | 709/227 |
| 2004/0078359 A1 | * | 4/2004 | Bolognese et al. | 707/3 |
| 2004/0139061 A1 | * | 7/2004 | Colossi et al. | 707/3 |
| 2004/0205587 A1 | * | 10/2004 | Draper | 715/513 |
| 2005/0193269 A1 | * | 9/2005 | Haswell et al. | 714/38 |

OTHER PUBLICATIONS

"Sybase," *Sybase PowerDesigner 9.5 Highlights*, 2 pages, <http://www.sybase.com/detail/printthis/1,6907,1016578,00.html>, visited Jul. 26, 2004.

European Patent Office Communication Pursuant to Article 94(3) EPC; Application No. 04 756 813.4-2201; Ref. 4503; Applicant: Computer Associates Think, Inc., Apr. 28, 2009.

"Programmable Syntax Macros", by Daniel Weise and Roger Crew; Microsoft Research Laboratory; XP 000380808, Jun. 28, 1993.

* cited by examiner

*Primary Examiner*—Cam Y T Truong
(74) *Attorney, Agent, or Firm*—Baker Botts L.L.P.

(57) ABSTRACT

A method for generating a structured query language (SQL) script based on a template includes selecting one object from a plurality of objects in a data model. At least one instruction is selected based, at least in part, on a type of the selected object and, then, an associated template string is selected based on each selected instruction. At least a portion of a SQL script is automatically generated based on the one or more selected template strings.

27 Claims, 2 Drawing Sheets

SYSTEM AND METHOD FOR GENERATING SQL USING TEMPLATES

RELATED APPLICATION

This application claims the priority under 35 U.S.C. §119 of provisional application Ser. No. 60/486,773 filed Jul. 11, 2003.

TECHNICAL FIELD

This disclosure relates generally to the field of data processing and, more specifically, to generating SQL using templates.

BACKGROUND

Databases, or database management systems (DBMSs), are widely used for the storage and retrieval of information. Many databases are compatible with a structured query language (SQL), which defines, retrieves, and views data and data structures within the database or DBMS. Databases often include data defined in a data model that can be exposed as objects with discoverable types, wherein descriptive information about the object is held in a set of properties. These objects and properties can be examined or updated by externally implemented code such as, for example, an API, scripting language, or SQL. Further, certain types of objects and the types of properties on those objects may not be known at the time of the modeling tool's construction including user-defined objects (UDOs) and user-defined properties (UDPs).

SUMMARY

This disclosure provides a system and method for generating a structured query language (SQL) script based on a template. In one embodiment, the method includes selecting one object from a plurality of objects in a data model. At least one instruction is selected based, at least in part, on a type of the selected object and, then, an associated template string is selected based on each selected instruction. At least a portion of a SQL script is automatically generated based on the one or more selected template strings.

In another embodiment, the method includes selecting one object from a plurality of objects in a data model. At least one instruction is selected based, at least in part, on a type of the selected object and, then, an associated template string is selected based on each selected instruction. Each instruction comprising a template string identifier and a bucket identifier. A second object is selected from the plurality of objects in the data model. At least one instruction is selected based, at least in part, on a type of the second object and, then, an associated template string is selected based on each selected instruction. The two template strings are then concatenated and sorted based on the bucket identifier of each associated instruction. The SQL script is then generated based on the concatenated template strings.

The details of one or more embodiments of the disclosure are set forth in the accompanying drawings and the description below. Particular features, objects, and advantages of the disclosure will be apparent from the description and drawings and from the claims.

DESCRIPTION OF EXAMPLE EMBODIMENTS

Figure 1:
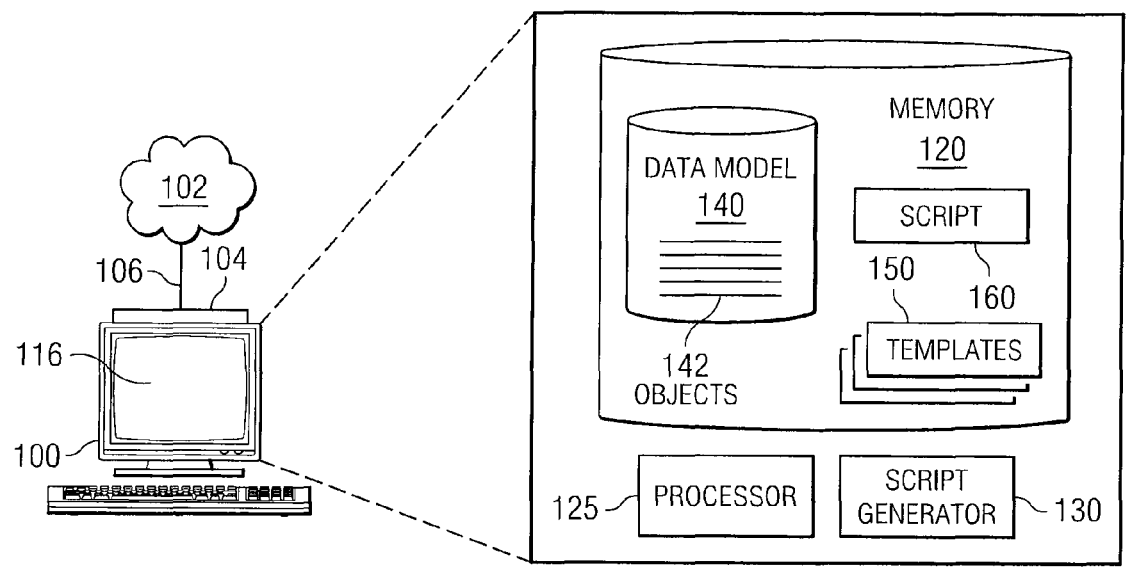
FIG. 1 illustrates an example system for generating SQL using templates in accordance with one embodiment of the present disclosure.

FIG. 1 is a block diagram illustrating a computer system 100 for generating Structured Query Language (SQL) using templates 150. As used herein, "SQL" comprises any of the plurality of versions of the SQL relational database query and manipulation language such as, for example, SEQUEL, ANSI SQL, or any other variant or generic database query language. Generally, the present disclosure allows system 100 to utilize information included in data model 140 for insertion into the generated SQL scripts 160 based on templates 150. Indeed, in one embodiment, system 100 is given access to substantially all information in data model 140 via templates 150. This information can then be embedded into the generated SQL script 160, including comments or other documentation, and subsequently customized. For example, system 100 may include an entity-relationship (ER) diagramming application operable to generate SQL based on a generated or imported data model 140. The present disclosure provides a user with the ability to customize the text generated in any suitable area such as capitalization, use of alternate valid syntax, text formatting, and others. Moreover, the present disclosure may require less development and debugging time on the part of developers and less administration time on the part of users or supervisors.

At a high level, the present disclosure contemplates any system 100 that automatically generates at least a portion of SQL script 160 based on objects 142 and associated properties included in data model 140 using one or more templates 150. Accordingly, computer 100 may comprise a portion or all of a database management system (DBMS). For example, system 100 may parse data model 140, included in the DBMS, into discreet objects 142, dynamically select portions of template code 150 based on objects 142, and automatically generate one or more SQL scripts 160 based on the selected template code 150. The term "automatically," as used herein, generally means that the appropriate processing is substantially performed by at least part of system 100. It should be understood that "automatically" further contemplates any suitable user interaction with system 100 without departing from the scope of this disclosure. The term "dynamically," as used herein, generally means that the appropriate processing is determined at least partially at run-time based on one or more variables such as, for example, the contents of templates 150 selected by script generator 130 based on objects 142.

Computer system 100 includes graphical user interface 116, memory 120, processor 125, and at least one input device such as a keyboard, mouse or touch screen. The illustrated system 100 also includes script generator 130, data model 140, templates 150, and SQL scripts 160, each of which may be stored in memory 120 and executed or processed by processor 125. At a high level, as used in this document the term "computer" is intended to encompass a personal computer, workstation, server network computer, mainframe or any other suitable processing device. Computer system 100 may execute any operating system including UNIX, Windows, Linux, and others. FIG. 1 only provides one example of a computer that may be used with the disclosure and the present disclosure contemplates computers other than general purpose computers as well as computers without conventional operating systems.

Graphical user interface (GUI) 116 comprises, at least, a graphical user interface operable to allow the user of computer 100 to interact with one or more processes executing on computer 100. Generally, GUI 116 provides the user of computer 100 with an efficient and user-friendly presentation of data provided by computer 100 or network 102. GUI 116 may comprise a plurality of displays having interactive fields, pull-down lists, and buttons operated by the user. In one example, GUI 116 presents an explorer-type interface and receives commands from the user. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 100 and efficiently presents the information to the user. Network 102 can accept data from the user of computer 100 via the web browser (e.g., Microsoft Internet Explorer or Netscape Navigator) and return the appropriate HTML, Java, or eXtensible Markup Language (XML) responses.

Computer 100 may include an interface 104 for communicating with other computer systems over network 102 such as, for example, in a client-server or other distributed environment via link 106. In certain embodiments, computer 100 may receive objects 142 or templates 150 via network 102 for storage in memory 120. Network 102 facilitates wireless or wireline communication between computer system 100 and any other computer. Network 102 may communicate, for example, Internet Protocol (IP) packets, Frame Relay frames, Asynchronous Transfer Mode (ATM) cells, voice, video, data, and other suitable information between network addresses. Network 102 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 104 comprises logic encoded in software and/or hardware in a suitable combination and operable to communicate with network 102 via link 106. More specifically, interface 104 may comprise software supporting one or more communications protocols associated with link 106 and communications network 102 hardware operable to communicate physical signals.

Memory 120 may include any memory, hard drive, or database module and may take the form of volatile or non-volatile memory including, without limitation, magnetic media, optical media, random access memory (RAM), read-only memory or modules (ROM), removable media, or any other suitable local or remote memory component. Illustrated memory 120 includes script generator 130, data model 140, templates 150, and often at least one SQL script 160. But memory 120 may include any other suitable data or modules without departing from the scope of this disclosure. Processor 125 executes instructions and manipulates data to perform the operations of computer 100 and associated modules, such as processing by script generator 130. Although FIG. 1 illustrates a single processor 125 in computer 100, multiple processors 125 may be used and reference to processor 125 is meant to include multiple processors 125 where applicable.

Script generator 130 could include any hardware, software, firmware, logic, or combination thereof operable to generate one or more SQL scripts 160 based on templates 150 and data model 140 within the scope of this disclosure. For example, script generator 130 may be written in any appropriate computer language including C, C++, Java, Visual Basic, Perl, and others. Further, it will be understood that while script generator 130 is illustrated as a single multi-tasked module, the features and functionality performed by this module may be performed by multiple modules such as, for example, a macro engine and a generation engine. Moreover, while not illustrated, script generator 130 may be a child or sub-module to any other appropriate software module such as, for example, an ER diagramming application without departing from the scope of this disclosure.

Data model 140 comprises any physical or logical description of data operable to be defined, processed, or retrieved by externally implemented code. According to one embodiment, data model 140 may comprise an ER diagram or a relational database schema described in terms of SQL statements or scripts 160. Relational databases often use sets of schemas to describe the tables, columns, and relationships in the tables using basic principles known in the field of database design. In another embodiment, data model 140 may comprise XML documents, flat files, Btrieve files or comma-separated-value (CSV) files. In short, data model 140 is any data schema comprising a plurality of objects 142. Each object 142 comprises a data structure operable to store select data in any particular format, so long as properties can be discerned. As used herein, the term each means every one of at least a subset of data objects 142. For example, object 142 may comprise one of many database tables in example relational database 140. Each object 142 comprises an object type and is associated with one or more properties, descriptive information, or any other appropriate metadata. Data model 140 is further operable to include other types of data elements such as, for example, user-defined objects (UDOs) and user-defined properties (UDPs).

Figure 2:
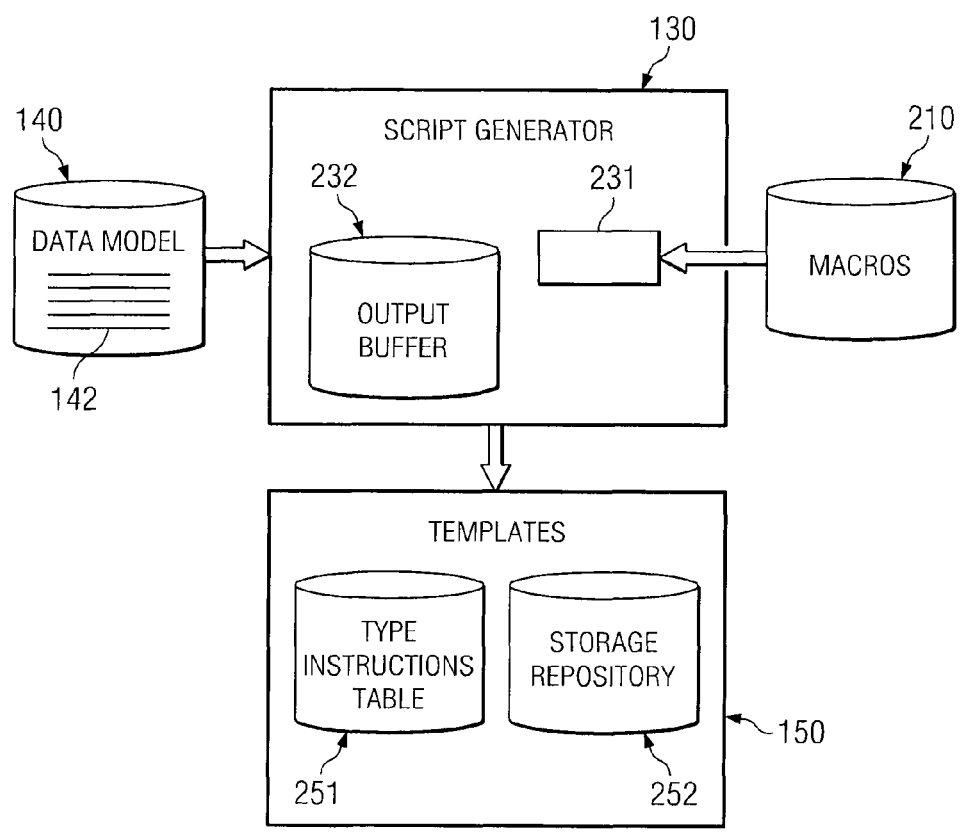
FIG. 2 illustrates an example script generator associated with the system in FIG. 1.

Template table 150 is any data structure including one or more portions of code, logic, object-oriented classes, or other changeable algorithms used by script generator 130 to create at least a portion of SQL script 160 based on data objects 142. For example, template table 150 may include interface instructions that provide script generator 130 with dynamic logic to process data model 140. Template table 150 may be of any suitable format including XML table, source code, flat file, CSV file, relational database table, and others. As illustrated in FIG. 2, template table 150 may comprise two separate tables such as, for example, template string repository 252 and type instructions table 251. Further, template table 150 may include a portion or all of a previously generated SQL script 160 without departing from the scope of the disclosure. Generally, SQL script 160 comprises any SQL, API, or code operable to process any suitable data storage. For example, SQL script 160 may comprise a plurality of SQL statements, such as JOIN, DROP_TABLE, MODIFY, SELECT, DELETE, or UPDATE, without departing from the scope of this disclosure. SQL script 160 may be used by any DBMS, whether local or remote, to select, modify, delete, or otherwise process one or more data structures associated with the database.

In one aspect of operation, script generator 130 initiates the process by starting an iteration over data model 140, visiting each object 142 at least once. During the iteration, script generator 130 sorts objects 142 based on one of any valid topological orders or selected using any appropriate parameter. For example, system 100 contemplates that at least one valid order may be dynamically determined by examination of the exposed objects 142 and the associated properties. In one example, if the order of processing the objects 142 is immaterial, then script generator 130 can traverse the selected objects 142 in any order. In another example, if the order of processing the types of objects 142 appears to be significant, but the order of objects 142 within a certain type is immaterial, then script generator 130 can traverse the objects 142, by type, in any order as the bucketing allows sections of SQL code to be sorted at generation time. In yet another example, if the order of processing individual instances of objects 142 within a given type is significant, then script generator 130 may elect to traverse objects 142 in an unspecified order as the correct order can be coerced onto the iteration via macro invocations in the template code 150. However, typically, the script generator 130 may traverse objects 142 in one particular order for performance reasons.

FIG. 2 illustrates one example embodiment of script generator 130 for generating SQL scripts 160 based on templates 150, data model 140, and macros 210. In this example embodiment, script generator 130 comprises macro engine 231 and output buffer 232. It will be understood that while script generator 130 is illustrated as including macro engine 231 and output buffer 232, these modules may be logically or physically separate so long as they are communicably coupled as appropriate.

Macro engine 231 may comprise any hardware, software, firmware, logic, or combination thereof operable to include, process, or execute one or more macros 210 that allow access to and traversal of the exposed data model 140. At a high level, macros 210 provide system 100 with the ability to execute external processes and use the results of those processes to dynamically supplement the SQL generation. In certain embodiments, macros 210 may include, but are not limited to, reading property values, conditional evaluation of expressions, iteration over associated objects, and any other appropriate external process. For example, macro 210 may comprise pre-registered or predefined processes such as "Predefined macro: GetProperty" or "Predefined macro: ForEachOwnedObject." UDPs are often visible to one or more of the plurality of macros 210, thereby expanding customizable information that may be used in the SQL generation process. Further, macro 210 may allow extensions by system 100 to execute named processes at any point in the expansion of template strings into more suitable template code. This technique often allows real-time, or dynamic, decision making by script generator 130. For example, the present disclosure contemplates the generation of SQL script 160 compatible with a database with different versions that permit slightly different syntactical elements in the SQL code. Script generator 130 may utilize one or more macros 210 to query the example database to obtain the associated version and then generate results based on the received version, as appropriate. Moreover, while illustrated separately, it will be understood that macro engine 231 may include macros 210 without departing from the scope of this disclosure.

In certain embodiments, macro engine 231 may maintain information about the particular object 142 in data model 140 currently being processed. For example, this information may be maintained in a stack format so that macros 210 could change the context of execution temporarily and then restore the previous state. Macro engine 231 may also include an external API that allows new macros 210 to be dynamically registered such as, for example, an API constructed on Microsoft's COM technology that dynamically loads modules comprising macros 210 and registers them with macro engine 231. Macro engine 231 may be further operable to determine a valid order for the UDOs within a certain object type via the construction of one or more appropriate macros 210. This subset of macros 210 would be responsible for ensuring that the order of object processing for the objects 142 was valid. One technique includes the addition of an iterator macro 210 via an external API of macro engine 231. This example iterator macro 210 comprises algorithms or other logic operable to traverse a set of data structures. In this case, the data structures might be UDO instances. Since a valid order for generation may be discernible by external inspection of the objects 142 and properties, example iterator macro 210 could sort the objects 142 into the valid order and return them to the requesting module such as macro engine 231 or script generator 130. A second technique includes construction or utilization of macro 210 comprising recursive algorithms to process the objects 142 in the correct order. As each object 142 is processed, macro 210 executes lists of instructions in order to examine the selected object 142 to determine if other objects 142 should be processed first. If so, macro engine 231 may push the new object 142 onto the context stack and process it in a like manner. Macro engine 231 may maintain a list of objects 142 that it had processed in this manner to confirm that objects 142 are not processed a second time when the traversal of script generator 130 brought them to currency. It will be understood that any technique or approach to construction of macro 210 may be used and the above techniques are for illustration purposes only.

Example script generator 130 also includes an output buffer 232. Output buffer 232 generally comprises any data structure operable to temporarily store portions of SQL script 160 during the generation process. For example, once the generation process is complete, output buffer will often include substantially all of portions of code to be used to generate the requested SQL script 160. According to certain embodiments, output buffer 232 is a two dimensional array of string values that will be used to generate the final script. For ease of understanding, the index of the least-rapidly varying element of the array is termed a bucket and the index of the most-rapidly varying element of the array is termed an item. For example, the lower limit of both bucket and item may be zero and the upper limits of both bucket and item are open-ended.

Type instructions table 251 is a set of mappings, each correlating a type of object 142 found in data model 140 to a list of instruction instances. Type instructions table 251 includes any number of instructions in any suitable format such as, for example, CSV, XML, text, database table, or other. The technique of specifying the type of object 142 in the type instruction may utilize any number of fields or variables but will typically comprise a string name, numeric code, or other globally unique identifier such as a UUID. Each instruction further includes several pieces of information such as, for example, an identifier of one or more template strings and a bucket identifier. In this example layout, the bucket identifier comprises a number or other identifier operable to assist script generator 130 in determining the appropriate order for the plurality of SQL statements in generated script 160. The template string identifier comprises a pointer, foreign key, or other identifier used by script generator 130 to select one or more portions of template code from template string repository 252.

Template string repository 252 is a collection of strings or raw, unexpanded template code. Template string repository 252 may include any number of strings, template code, or statements in any layout without departing from the scope of this disclosure. Template string repository 252 may be implemented as a text file on disk, XML file, a resource file in a programming project, a database table, or any other means of storage that allows for i) retrieval of the strings by a unique identifier and ii) storage of standard or modified versions of the strings. Each piece of template code, or strings, may include boilerplate literals as well as macro calls to retrieve substitution parameters. Each stored string is uniquely identified by a name, memory address, pointer, number, or other identifier. As described above, script generator 130 uses this identifier to map from one of the instructions in type instruction table 251 to the appropriate string. Template string repository 252 may further include one or more sets of statement templates utilized for the generation of UDOs. The mapping of the type of UDO to a set of strings may be added to the type instructions table 251. If the one or more SQL statements, in script 160, associated with the UDO need to occur in certain positions relative to the statements for other object types, then the statements may be designated for placement in the appropriate bucket, with new buckets added as appropriate, allowing for the placements of existing statements adjusted.

In one aspect of operation, script generator 130 selects first object 142 from data model 140. Based on a determined object type, script generator selects one of the instructions from type instruction table 251. Script generator 130 extracts the string identifier from the instruction and selects one of the strings from template string repository 252. If the selected string includes one or more macro references, then script generator passes these references to macro engine 231. Once macro engine 231 completes processing of the one or more macros, script generator 130 stores the expanded or modified string in output buffer 232. Otherwise script generator 130 stores the original string in output buffer 232. Script generator 130 processes each appropriate object 142 according to these techniques. Once data model 140 is appropriately processed and output buffer 232 includes the template code, script generator 130 determines the proper order of the strings based on the bucket identifier and concatenates the strings into SQL script 160.

Figure 3:
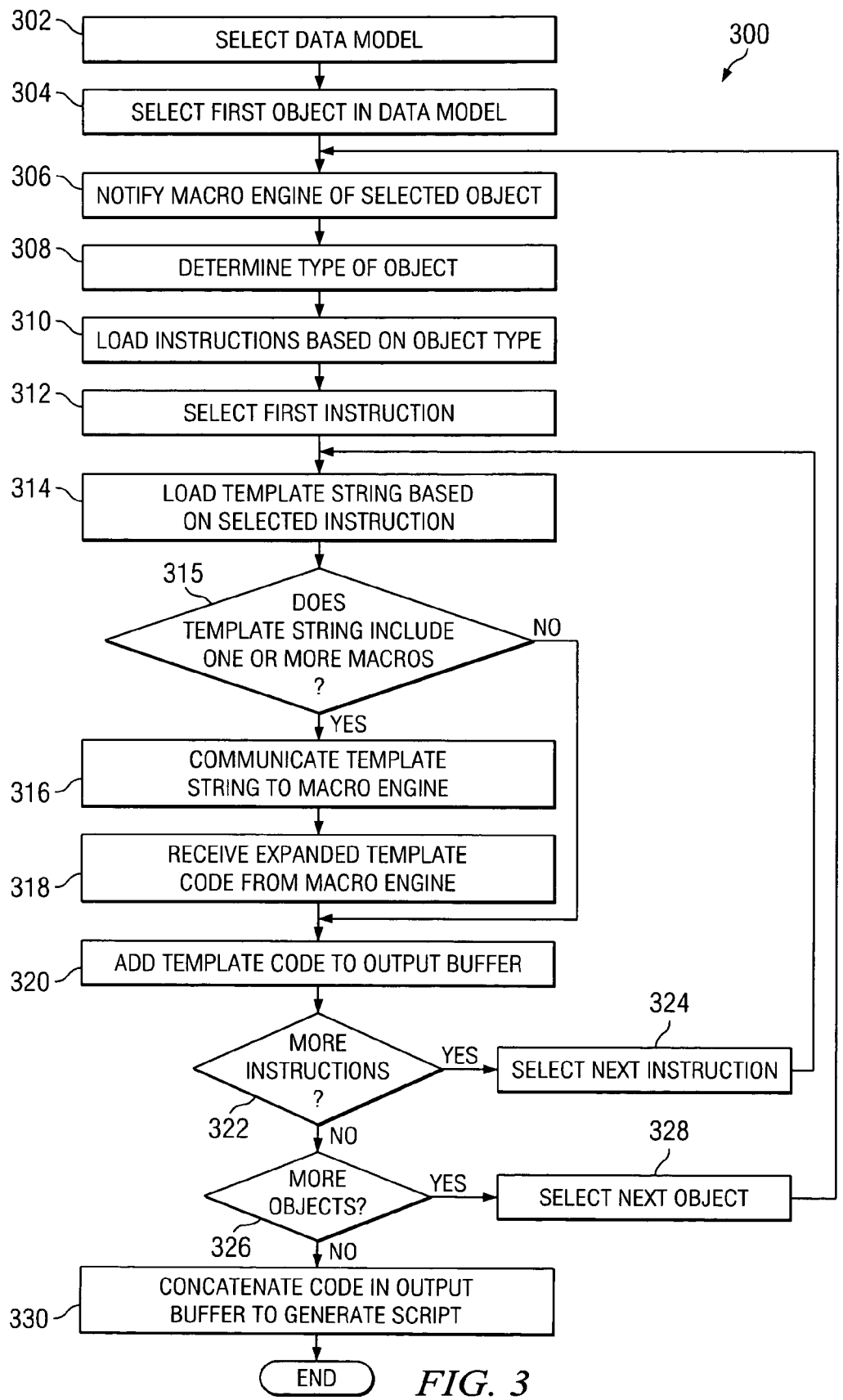
FIG. 3 is a flowchart illustrating an example method for generating SQL using templates in accordance with one embodiment of the present disclosure.

FIG. 3 illustrates an example method 300 for generating SQL scripts 160 based on templates 150 and data model 140. Generally, method 300 describes script generator 130 processing data model 140, selecting portions of template code based on objects 142 in data model 140, and generating at least a portion of SQL script 160 based on concatenated portions of template 150. Method 300 is described in respect to system 100 and script generator 130. However, any other suitable system may use different embodiments of method 300 to generate SQL scripts 160 based on templates 150 without departing from the scope of this disclosure.

Method 300 begins in step 302, in which script generator 130 selects data model 140 for processing. As described above, this selection may be automatic, in response to a user command, or receiving data model 140 via network 102. Script generator 130 then selects a first object 142 in the selected data model 140 at step 304. Next, at step 306, script generator 130 notifies macro engine 231 of the selected object 142. Script generator 130 then determines the type of object 142 at step 308 based on at least one associated property. It will be understood that script generator 130 may determine any other suitable characteristic of object 142 at step 308 without departing from the scope of this disclosure. Once the script generator 130 has appropriately processed object 142, script generator 130 determines the appropriate portions of one or more templates 150 to generate SQL script 160 based on selected object 142 in steps 310 through 320.

Once script generator 130 has processed object 142, script generator 130 loads one or more instructions from type instruction table 251 based on the determined object type at step 310. Next, at step 312, script generator 130 selects a first instruction from the loaded one or more instructions. At step 314, script generator 130 loads one template string from template string repository 252 based on the current selected instruction. Processing then proceeds to decisional step 315, where script generator 130 determines if the loaded template string includes one or more macros 210 or one or more links or references to at least one macro 210. If the template string does include one or more macros 210 or reference thereto, then script generator 130 communicates the template string to macro engine 231 at step 316. Once macro engine 231 receives the template string, macro engine 231 processes or executes any appropriate macro 210 included in the template string. Once macro engine 231 has processed each macro 210, then each result of the macro processing is used to expand the template string. After macro engine 231 has substantially completed processing of the appropriate template string and the associated macros 210 to create expanded template code, script generator 130 receives the expanded template code from macro engine 231 at step 318. Once script generator 130 receives the expanded template code or if a template string did not include one or more macros step 210 at decisional step 315, script generator 130 adds the appropriate template code to output buffer 232 at step 320. It will be understood that typically, but not always, this template code, whether expanded or not, comprises at least a portion of script 160. However, the template code may alternatively comprise user comments or other non-executable portions of SQL script 160. Next, at decisional step 322, script generator 130 determines if there are more instructions loaded from type instruction table 251 based on the object type. If there are remaining instructions, then script generator 130 selects the next instruction at step 324 and processing returns to step 314. Once there are no more instructions, the processing proceeds to decisional step 326, in which script generator 130 determines if there are more objects 142 in the selected data model 140. If there are more objects 142, then script generator 130 selects the next object 142 at step 328 and processing returns to step 306. Once there are no more unprocessed objects 142 in data model 140, then script generator 130 loads at least a portion of the template code stored in output buffer 232. Once the desired template code is loaded, script generator 130 concatenates the loaded template code to generate SQL script 160 at step 330. The generated SQL script 160 may be then used to query any appropriate database or may be customized for subsequent usage. It will be understood that script generator 130 may concatenate the portions of template code based, at least in part, on upon an order type (such as bucket identifier) stored in the template string, instruction, or object 142 as appropriate.

The preceding flowchart and accompanying description illustrate only an exemplary method 300 used by script generator 130 to generate SQL scripts 160 based on templates 150. However, system 100 contemplates script generator 130 using any suitable technique for performing these tasks. Thus, many of the steps in this flowchart may take place simultaneously and/or in different orders than as shown. Moreover, script generator 130 may implement methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for generating a structured query language (SQL) script based on a template, the method comprises:

selecting one object from a plurality of objects in a data model;

automatically selecting, without user input, at least one first instruction based, at least in part, on a type of the selected object;

selecting a first template string based on the selected at least one first instruction; selecting a second object from the plurality of objects in the data model;

selecting at least one second instruction based, at least in part, on a type of the second object;

selecting a second template string based on the selected at least one second instruction;

using a script generator to automatically, and without user input, sort and concatenate the first and second template strings from the selected objects, the script generator automatically sorting and concatenating the first and second template strings in an order identified by the first and second instructions and based on the types of the first and second objects; and using one or more processors to automatically generate at least a portion of the SQL script based on the sorted and concatenated first and second template strings of the order identified by the first and second instructions.

2. The method of claim 1, one or more of the plurality of objects comprising a user-defined object.

3. The method of claim 1 further comprising selecting the data model from a plurality of data models.

4. The method of claim 1 further comprising:

determining the existence of one or more macros in a selected template string of the selected template strings; and in response, at least in part, to locating one or more macros in the selected template string, processing the located one or more macros.

5. The method of claim 4 further comprising expanding the template string associated with the one or more macros based on a result from each macro processing and wherein generating the SQL script is further based on the expanded template string.

6. The method of claim 4, each macro selected from the group comprising:

determining a value of an environment variable;

determining a value of a property associated with the data model;

determining a value of a property associated with the selected object;

evaluating a conditional expression; and iterating over a subset of the plurality of objects, the subset associated with the selected object.

7. The method of claim 1, wherein each instruction comprising a template string identifier and a bucket identifier and the method further comprises sorting the concatenated template strings based on the bucket identifier of each associated instruction.

8. The method of claim 1 further comprising dynamically adding user comments to the SQL script based on at least one of the selected template strings.

9. The method of claim 1, wherein selecting the associated template string comprises selecting the associated template string based on the type of the selected object associated with each selected instruction.

10. The method of claim 1, wherein selecting the at least one instruction based, at least in part, on the type of the selected object comprises:

accessing a type instruction table; and selecting the at least one instruction from the type instruction table, based at least in part, on the type of the selected object.

11. Software for generating a structured query language (SQL) script based on a template, the software embodied in a memory for storing software and operable when executed by a computer to:

select one object from a plurality of objects in a data model;

automatically select, without user input, at least one first instruction based, at least in part, on a type of the selected object;

select a first template string based on the selected at least one first instruction;

select a second object from the plurality of objects in the data model;

select at least one second instruction based, at least in part, on a type of the second object;

select a second template string based on the selected at least one second instruction;

automatically, and without user input, sorting and concatenating the template strings from the selected objects in an order identified by the first and second instructions and based on the types of the first and second objects;

automatically generate at least a portion of the SQL script based on the sorted and concatenated first and second template strings in the order identified by the first and second instructions.

12. The software of claim 11, one or more of the plurality of objects comprising a user-defined object.

13. The software of claim 11 further operable to select the data model from a plurality of data models.

14. The software of claim 11 further operable to:

determine the existence of one or more macros in a selected template string of the selected template strings; and in response, at least in part, to locating one or more macros in the selected template string, process the located one or more macros.

15. The software of claim 14 further operable to expand the template string associated with the one or more macros based on a result from each macro processing and wherein generating the SQL script is further based on the expanded template string.

16. The software of claim 14, each macro selected from the group comprising:

determining a value of an environment variable;

determining a value of a property associated with the data model;

determining a value of a property associated with the selected object;

evaluating a conditional expression; and iterating over a subset of the plurality of objects, the subset associated with the selected object.

17. The software of claim 11, each instruction comprising a template string identifier and a bucket identifier and the software further operable to sort the concatenated template strings based on the bucket identifier of each associated instruction.

18. The software of claim 11 further operable to dynamically add user comments to the SQL script based on at least one of the selected template strings.

19. A system for generating a structured query language (SQL) script based on a template, the system comprises:

memory operable to store a data model, a plurality of instructions, and a plurality of template strings and the data model comprising a plurality of objects; and one or more processors operable to:

select one object from the plurality of objects in the data model;

automatically select, without user input, at least one first instruction based, at least in part, on a type of the selected object;

select a first template string based on the selected at least one first instruction;

select a second object from the plurality of objects in the data model;

select at least one second instruction based, at least in part, on a type of the second object;

select a second template string based on the selected at least one second instruction;

automatically, and without user input, sort and concatenate the template strings from the selected objects in an order identified by the first and second instructions and based on the types of the first and second objects; and automatically generate at least a portion of the SQL script based on the sorted and concatenated first and second template strings in the order identified by the first and second instructions.

20. The system of claim 19, one or more of the plurality of objects comprising a user-defined object.

21. The system of claim 19, the one or more processors further operable to select the data model from a plurality of data models.

22. The system of claim 19, the one or more processors further operable to:

determine the existence of one or more macros in a selected template string of the selected template strings;

and in response, at least in part, to locating one or more macros in the selected template string, process the located one or more macros.

23. The system of claim 22, the one or more processors further operable to expand the template string associated with the one or more macros based on a result from each macro processing and wherein generating the SQL script is further based on the expanded template strings.

24. The system of claim 22, each macro selected from the group comprising:

determining a value of an environment variable;

determining a value of a property associated with the data model;

determining a value of a property associated with the selected object;

evaluating a conditional expression; and iterating over a subset of the plurality of objects, the subset associated with the selected object.

25. The system of claim 19, each instruction comprising a template string identifier and a bucket identifier and the one or more processors further operable to sort the concatenated template strings based on the bucket identifier of each associated instruction.

26. The system of claim 19, the one or more processors further operable to dynamically add user comments to the SQL script based on at least one of the selected template strings.

27. A system for generating a structured query language (SQL) script based on a template, the system comprises:

means for selecting one object from a plurality of objects in a data model;

means for automatically selecting, without user input, at least one first instruction based, at least in part, on a type of the selected object;

means for selecting a first template string based on the selected at least one first instruction;

means for selecting a second object from the plurality of objects in the data model;

means for selecting at least one second instruction based, at least in part, on a type of the second object;

means for selecting a second template string based on the selected at least one second instruction;

means for automatically, and without user input, sorting and concatenating the template strings from the selected objects in an order identified by the first and second instructions and based on the types of the first and second objects; and means for using one or more processors to automatically generate at least a portion of the SQL script based on the sorted and concatenated first and second template strings in the order identified by the first and second instructions.

* * * * *